J. I. WEBER.
DRAPER CANVAS.
APPLICATION FILED MAR. 16, 1911.
1,012,486.
Patented Dec. 19, 1911.
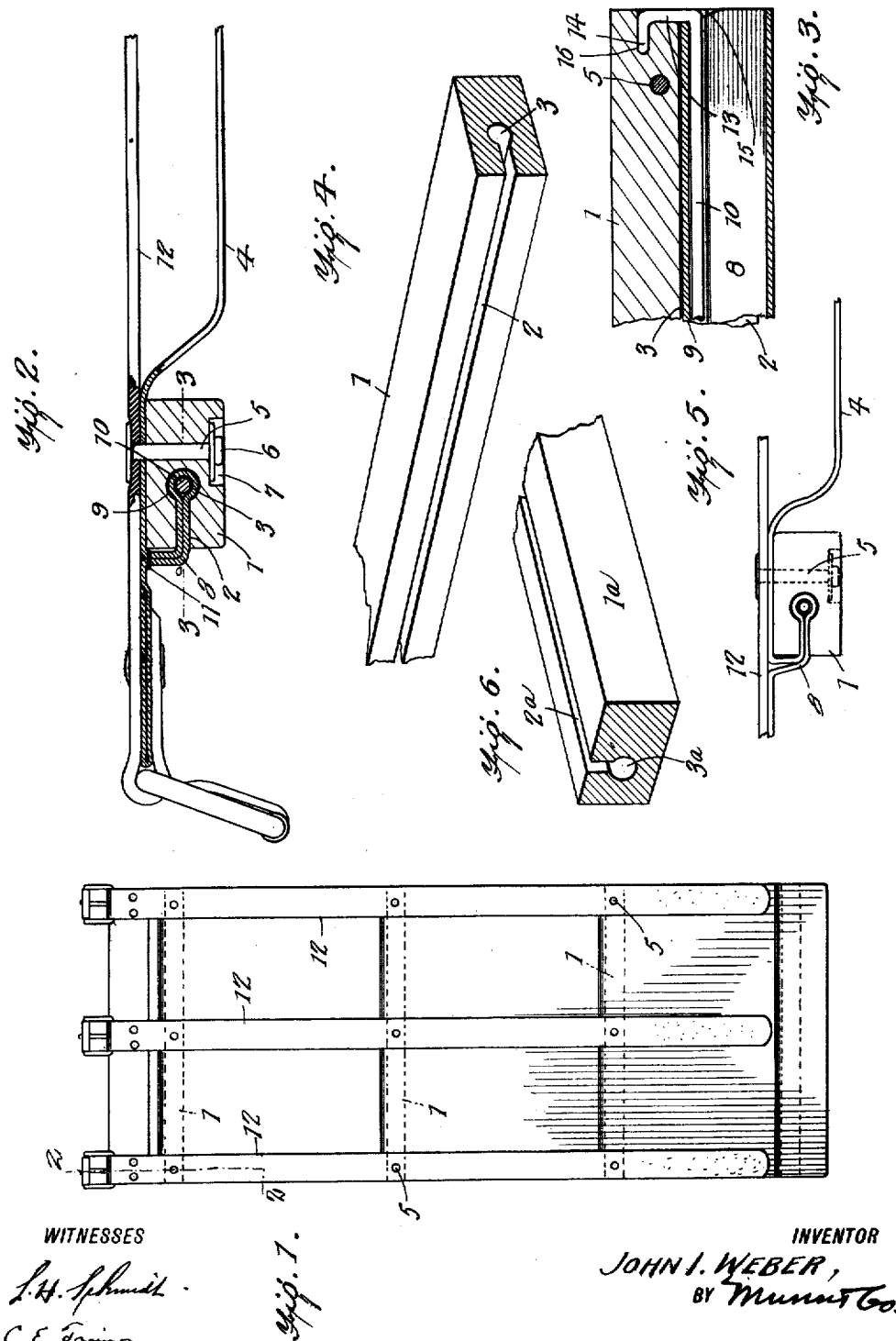
WITNESSES
INVENTOR
JOHN I. WEBER,
BY
ATTORNEYS ically designed to prevent any catching of

UNITED STATES PATENT OFFICE.

JOHN I. WEBER, OF MOSCOW, IDAHO.

DRAPER-CANVAS.

1,012,486.   Specification of Letters Patent.   Patented Dec. 19, 1911.

Application filed March 16, 1911. Serial No. 614,824.

*To all whom it may concern:*

Be it known that I, JOHN I. WEBER, a citizen of the United States, and a resident of Moscow, in the county of Latah, State of Idaho, have invented a new and useful Improvement in Draper-Canvas, of which the following is a specification.

My invention is an improvement in draper canvas, and consists in certain novel constructions and combinations of parts hereinafter described and claimed.

The object of the invention is to provide a draper canvas for use in harvesting machines for conveying the cut grain, especially designed to prevent any catching of the stalks in the draper, with a consequent increase of draft and liability to breakage.

In the drawings: Figure 1 is a plan view of the improvement; Fig. 2 is an enlarged sectional view taken on the line 2—2 of Fig. 1; Fig. 3 is a section on the line 3—3 of Fig. 2. Fig. 4 is a partial perspective view of a slat; Fig. 5 is a partial end view of the end of the draper; and Fig. 6 is a partial perspective view of a modified form of slat.

In the use of the ordinary draper, straw or grain stalks are very liable to become caught between the transverse slats and the canvas, thus choking the elevator and increasing the draft. In addition, there is great liability of breakage, and the machine must be stopped until the straw can be pulled out.

In the present embodiment of the invention, the slats 1 are of ordinary form and material and of any desired size and cross section, and each slat is provided in one edge with a longitudinal groove or channel 2 (Fig. 4).

The channel is of a depth slightly less than half the width of the slat (Fig. 2) and extends from end to end thereof. The bottom of the channel is enlarged to form a substantially cylindrical groove or recess 3, and the slats are secured to the canvas apron or belt 4 by means of rivets 5. The rivets are arranged at suitable intervals, and the head 6 of the rivet is seated in a countersink 7 in the outer face of the slat.

A portion of the canvas in front of the slat is doubled upon itself to form a lip or tuck 8, and the tuck is inserted in the channel 2 with the fold 9 of the tuck in the recess 3. The recess is of sufficient size to receive the fold loosely, and a rod 10 of suitable size is passed through the fold, thus securely holding the tuck.

The rod is of a diameter approximately equal to the width of the channel, so that, when engaged with the fold, the additional thickness of the canvas on the rod will prevent its pulling out transversely of the slat.

The rivets 5 are close to the recess 3, the heads of the rivets overlapping a portion of the recess. The lip or tuck is, as before stated, in front of the slat when the draper is in motion, so that the stalks are deflected away from the joint between the slat and the canvas by the lip. The stalks are thus prevented from becoming caught between the slat and the canvas.

The folds forming the lip or tuck are secured together at their junction with the apron, preferably by stitching, as indicated at 11 in Fig. 2. Strips 12 of leather or like material are arranged longitudinally of the apron or belt, and are secured to the belt and slats by the rivets 5.

One of the strips is arranged at each side edge, and one or more between the said edges. One end of the rod 10 is bent laterally at 13 and inwardly at 14, and the end of the slat is recessed transversely at 15 and longitudinally at 16 to receive the said portions. The outermost face of the bend 13 is flush with the end of the slat, so that it cannot become caught.

The above described arrangement holds the rod in place and prevents longitudinal movement. The rod is also straightened, especially at its ends, by the engagement of the portion 14 with the recess 16. It will be evident that the rod 10 may be of any suitable material and not necessarily of metal. There is no particular transverse strain, but rather a crushing stress.

The strips 12 receive the strain and were the strips omitted the pull on the lip is at right angles to the channel 2, so that the lip would hold without the rod. The free edge of the lip, tuck or fold is of greater thickness than the doubled portion beyond the lip on account of the resistance the fibers of the canvas offer to bending or folding. For this reason, a string of fabric or other material, or a reed, would answer the same purpose, and the said rod may be entirely omitted, if desired. As shown in the slat 1ª of Fig. 6, the channel 2ª may be in the face of the slat instead of in the edge. The recess 3ª is at the bottom of the channel.

The ends of the strip 12 are arranged to be connected together, or with other similar sections. One end of the strip is provided with a buckle 17 and the other with eyes 18 for engagement by the buckle.

I claim:

1. A draper comprising a strip of fabric material, and a plurality of slats arranged transversely of the strip at spaced intervals and connected thereto, each slat having a longitudinal groove or channel in its forward edge, the channel being enlarged at its bottom to form a recess substantially circular in cross section, and of a diameter greater than the width of the channel, the strip being folded upon itself and secured together in front of the slat to form a tuck, the tuck being inserted in the channel and being of a length to enter the recess, and a filling rod inserted between the folds of the tuck in the recess, one end of the rod being bent laterally and thence substantially parallel to the body of the rod, the slat having a recess for receiving the said bent portions.

2. A draper comprising a strip of fabric material, and a plurality of slats arranged transversely of the strip at spaced intervals and connected thereto, each slat having a longitudinal groove or channel in its forward edge, the channel being enlarged at its bottom to form a recess substantially circular in cross section, and of a diameter greater than the width of the channel, the strip being folded upon itself and secured together in front of the slat to form a tuck, the tuck being inserted in the channel and being of a length to enter the recess, and a filling rod inserted between the folds of the tuck in the recess, means for holding the rod from longitudinal movement.

3. A draper comprising a strip of fabric material, and a plurality of slats arranged transversely of the strip at spaced intervals and connected thereto, each slat having a longitudinal groove or channel in its forward edge, the channel being enlarged at its bottom to form a recess substantially circular in cross section, and of a diameter greater than the width of the channel, the strip being folded upon itself and secured together in front of the slat to form a tuck, the tuck being inserted in the channel and being of a length to enter the recess, and a filling rod inserted between the folds of the tuck in the recess.

4. A draper comprising a strip of fabric material, and a plurality of transverse spaced slats secured thereto, each slat having a longitudinal channel in its forward face, the channel being enlarged laterally at its bottom to form a recess, the strip being folded upon itself and secured together in front of each slat to form a tuck, said tuck being inserted in the channel and being of a length to permit the free edge of the tuck to enter the recess, and a filling rod between the folds of the tuck in the recess.

5. A draper comprising a strip of fabric material, and a plurality of transverse spaced slats secured thereto, each slat having a longitudinal channel in its forward face, the strip being folded upon itself in front of each slat and secured together to form a tuck, the tuck being inserted in the recess, and means for locking the tuck in the channel.

6. A draper comprising a strip of fabric material, and a plurality of transverse spaced slats secured thereto, each slat having a longitudinal channel in its forward face, the strip being folded upon itself in front of each slat and secured together to form a tuck, the tuck being inserted in the recess.

JOHN I. WEBER.

Witnesses:
U. S. G. Evans,
Ed. Vennigerholz.

Copies of this patent may be obtained for five cents each, by addressing the "Commissioner of Patents, Washington, D. C."